United States Patent
Kageyama

[11] Patent Number: 5,862,709
[45] Date of Patent: Jan. 26, 1999

[54] BICYCLE SHIFT CONTROL DEVICE

[75] Inventor: Tomohiko Kageyama, Sakai, Japan

[73] Assignee: Shimano, Inc, Osaka, Japan

[21] Appl. No.: 905,033

[22] Filed: Aug. 1, 1997

Related U.S. Application Data

[63] Continuation of Ser. No. 560,737, Nov. 20, 1995, abandoned.

[30] Foreign Application Priority Data

Aug. 9, 1995 [JP] Japan .................................. 7-203022

[51] Int. Cl.$^6$ .................................................. B62M 25/04
[52] U.S. Cl. .......................... 74/489; 74/501.6; 74/502.2
[58] Field of Search ..................... 74/489, 501.6, 74/502.2, 506

[56] References Cited

U.S. PATENT DOCUMENTS

| | | | |
|---|---|---|---|
| 3,633,437 | 1/1972 | Ishida | 74/489 |
| 4,019,402 | 4/1977 | Leonheart | 74/489 |
| 4,325,267 | 4/1982 | Kojima | 74/489 |
| 4,352,303 | 10/1982 | Christner | 74/489 |
| 4,900,291 | 2/1990 | Patterson | 474/80 |
| 5,012,692 | 5/1991 | Nagano | 74/475 |
| 5,197,927 | 3/1993 | Patterson et al. | 474/80 |
| 5,303,608 | 4/1994 | Iwasaki | 74/502.2 |
| 5,481,934 | 1/1996 | Tagawa | 74/475 |
| 5,564,310 | 10/1996 | Kishimoto | 74/489 |
| 5,609,064 | 3/1997 | Abe | 74/502.2 |

FOREIGN PATENT DOCUMENTS

| | | |
|---|---|---|
| 0 628 475 A1 | 12/1994 | European Pat. Off. . |
| 0 669 250 A1 | 8/1995 | European Pat. Off. . |
| 0 671 317 A1 | 9/1995 | European Pat. Off. . |
| 3012034A | 10/1981 | Germany . |
| 48-2600 | 1/1973 | Japan . |
| 2099961A | 12/1982 | United Kingdom . |

*Primary Examiner*—Richard M. Lorence
*Attorney, Agent, or Firm*—James A. Deland

[57] ABSTRACT

A bicycle shift control device comprises a guide member for mounting relative to an axis of a structural member of a bicycle. A rotatable shift member is guided by the guide member for rotation about an axis, wherein the axis of rotation of the rotatable shift member is inclined relative to the axis of the guide member.

21 Claims, 10 Drawing Sheets

BICYCLE SHIFT CONTROL DEVICE

This is a Continuation of application Ser. No. 08/560,737, filed Nov. 20, 1995, now abandoned.

BACKGROUND OF THE INVENTION

The present invention is directed to bicycle shift control devices and, more particularly, to shift control devices capable of mounting about the bicycle handlebar for rotation about the axis of the handlebar.

A conventional bicycle shift control device of the type which mounts on the handlebar of the bicycle for rotation about the axis of the handlebar has been disclosed, for example, in International Patent Publication W093/09993. In this publication, a shift member of sleeve form is fit over the peripheral surface of the handlebar adjacent to a grip that has been installed on the peripheral surface of the handlebar. The shift member is rotatable around the axis of the handlebar. With this device, the thumb of a hand gripping the grip is placed into contact with the peripheral surface of the shift member while rotating the shift member so that a shift cable winding reel takes up the shift cable or returns it so that operating displacement is provided to the derailleur that is connected to the other end of the shift cable.

The grip that is gripped by the palm of the hand and the fingers takes the form of cylindrical member installed concentrically with the handlebar axis, and the cylindrical shift member that is operated by the thumb is also a cylindrical member installed concentrically with the handlebar axis. Thus, the operating displacement of the shift member takes the form of rotational displacement around the axis of the handlebar. However, the sliding motion of the thumb of the hand is a swiveling motion having as its center the joint located at the origin of the thumb, so there is discrepancy between the direction of shift member rotational displacement and the direction of thumb swivel. As a result, it is necessary to shift the hand from the grip in order to rotate the control member by swiveling the thumb, sometimes producing a degree of comfort of operation that is not satisfactory. The discomfort during operation is particularly noticeable when the shift member is rotated to a significant degree in order to produce a large change in shift position.

SUMMARY OF THE INVENTION

The present invention is directed to a shift control member of the type which mounts about a bicycle handlebar for rotation about the axis of the handlebar wherein the direction of displacement of the shift control member closely matches the natural movement of the thumb. In one embodiment of the present invention, a bicycle shift control device comprises a guide member for mounting relative to an axis of a structural member of a bicycle. A rotatable shift member is guided by the guide member for rotation about an axis, wherein the axis of rotation of the rotatable shift member is inclined relative to the axis of the guide member. If desired, the axis of inclination may be between approximately 5° and 40°. In some embodiments, the rotatable shift member may be a ring or partial ring which moves over a sliding path formed by the guide member, and one or more projections may extend from the ring to facilitate operation by the thumb.

Various transmission mechanisms may be used to convert rotation of the shift member into a pulling force for a shift cable. For example, a transmission mechanism may comprise a shift lever, a winding member for attachment to a shift cable, a clutch for coupling rotation of the rotatable shift member to the winding member in a first rotational direction, and an interlink mechanism coupled to the shift lever and to the winding member for allowing the winding member to move in a second rotational direction in response to movement of the shift lever. Alternatively, a transmission mechanism may comprise a slide lever pivotally coupled to the shifting device at one end and to the shift cable at another end, a cam coupled for rotation in response to rotation of the rotatable shift member, and a cam follower coupled to the slide lever.

DETAILED DESCRIPTION OF THE EMBODIMENTS

Figure 1:
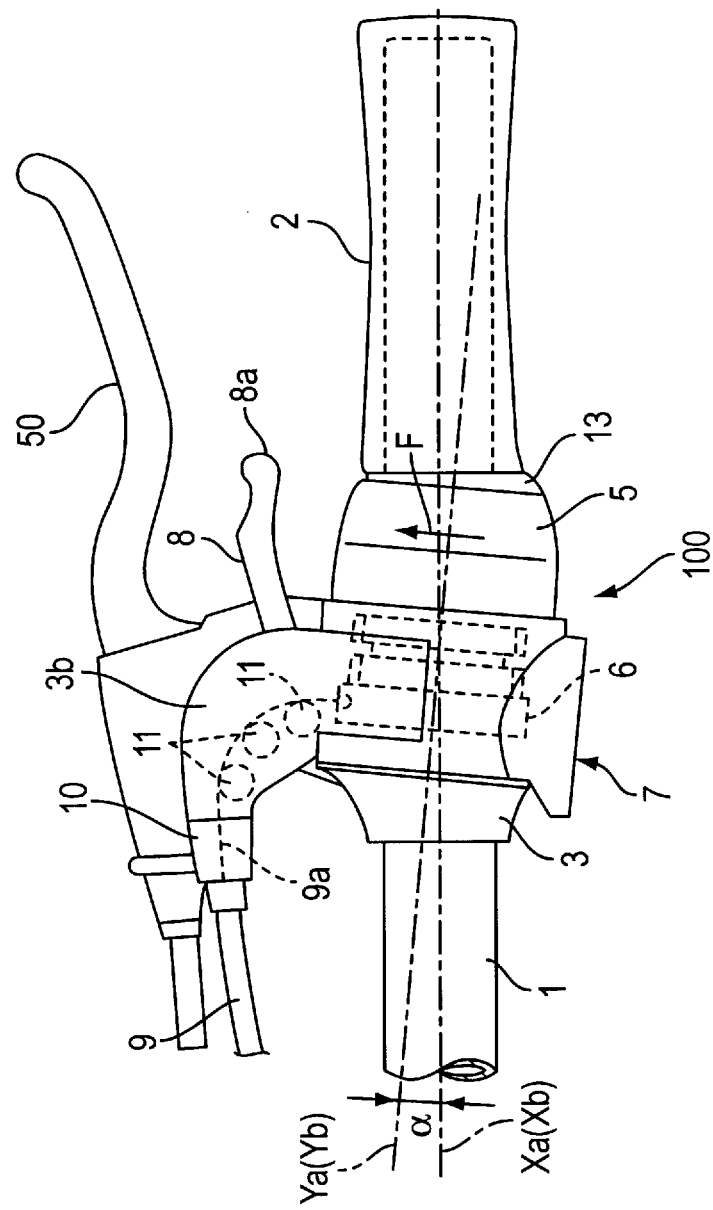
FIG. 1 is a plane view illustrating a particular embodiment of a bicycle shift control device according to the present invention.
Figure 2:
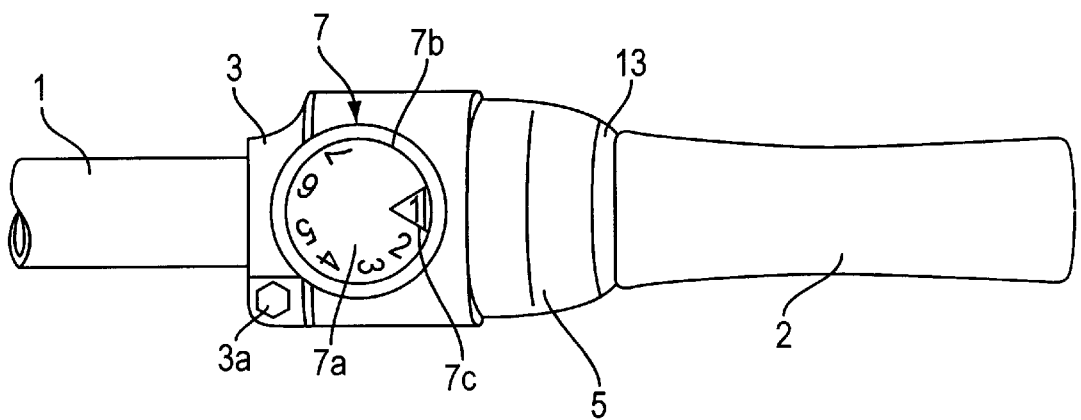
FIG. 2 is a view illustrating a particular embodiment of a speed indicator according to the present invention.

As depicted in FIGS. 1, 2, 3, and 4, a shift control device 100 is located adjacent to a grip 2 mounted with reference to a specified width on the peripheral surface at the end section of a bicycle handlebar 1 of pipe form which is one structural member of the bicycle. This shift control device 100 is provided with a mounting bracket 3 which is mounted on the peripheral surface of the bicycle handlebar 1. The inside perimeter surface of the mounting bracket 3 serves as a mounting surface that conforms in shape to the peripheral surface of the handlebar 1. When mounted on the handlebar, the center axis of the inside perimeter surface, i.e., mounting axis Xa, is substantially aligned with the axis Xb of the handlebar 1. In order to fix the mounting bracket 3 to the handlebar 1, a clamp bolt 3a is provided for clamping a mounting surface having a slit structure to the peripheral surface of the handlebar 1. The mounting bracket 3 forms an integrated structure with the brake lever 50.

The mounting bracket 3 is assembled with a cylindrical guide member 4 provided with a through hole 4a through which the handlebar passes. The rotating shift member 5 and a winding member 6 fit slidably over a peripheral surface having a round cross section which is formed as a guide section on the outside of the guide member 4. Since the guide surface is the surface of a cylindrical member, the sliding displacement of the rotating shift member 5 takes place stably and with a high degree of accuracy.

Figure 4:
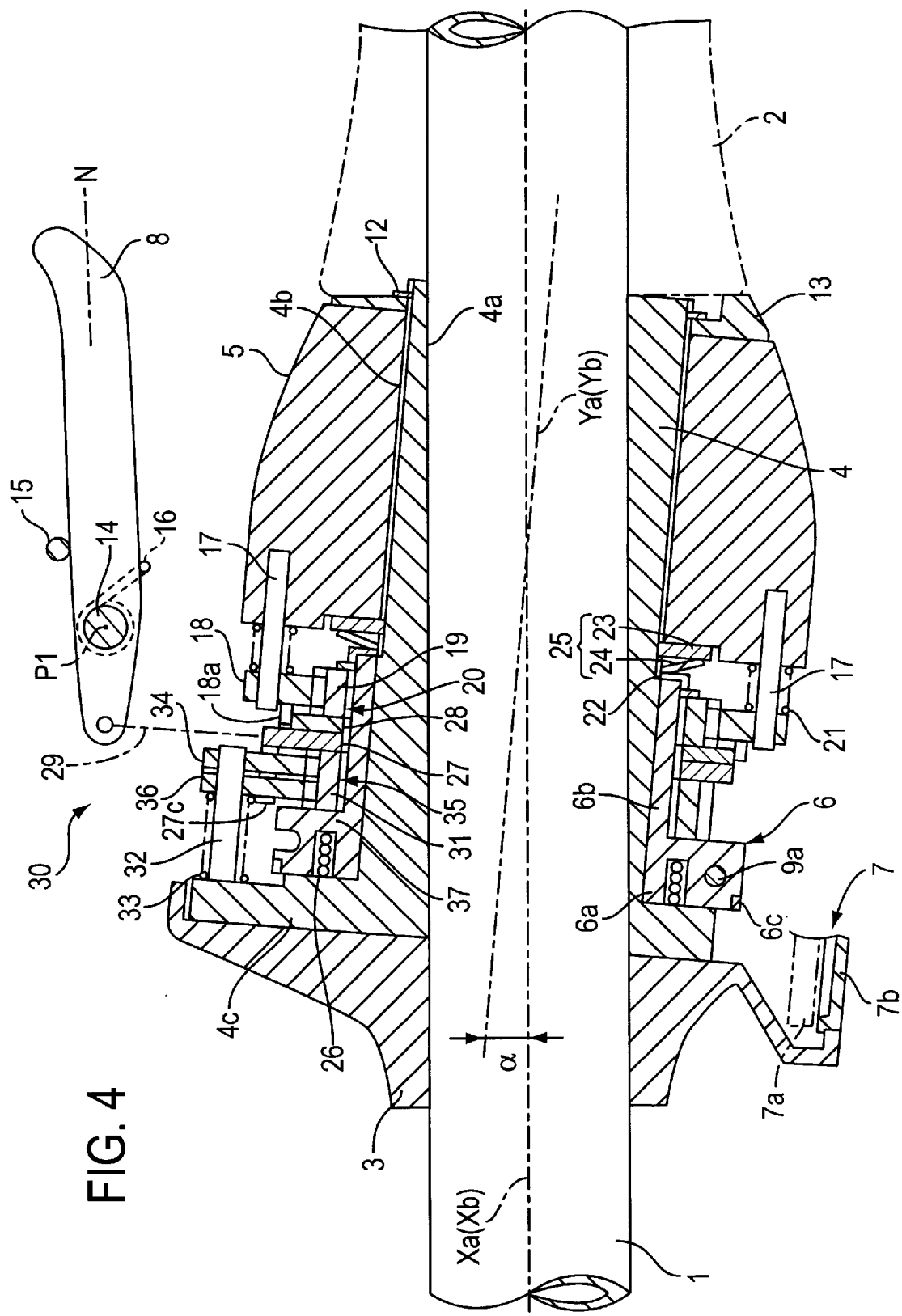
FIG. 4 is a cross-sectional view of the bicycle shift control device shown in FIG. 1.
Figure 5:
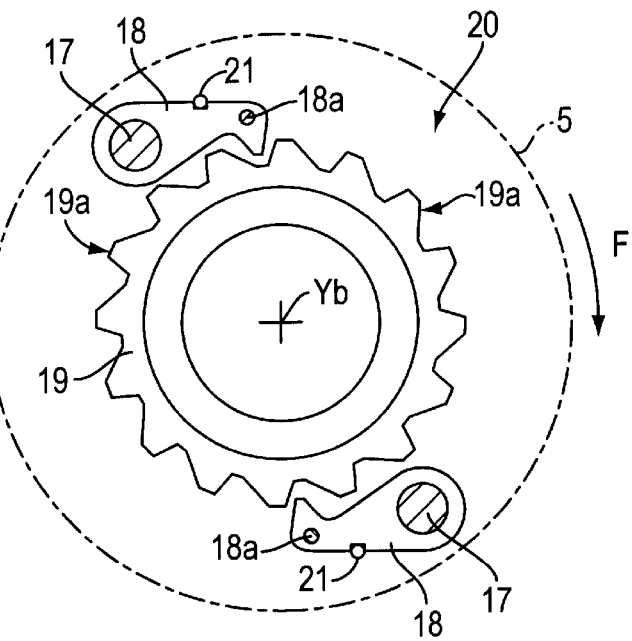
FIG. 5 is a side view illustrating a particular embodiment of a one-way clutch mechanism employed in the bicycle shift control device shown in FIG. 1.

As shown in FIG. 4, angle $\alpha$, which represents the incline of the axis Ya of the peripheral surface 4b of the guide member 4 (i.e., the axis of rotation Yb of the rotating shift member 5) with respect to the axis of the through hole 4a (i.e., the handlebar axis Xb or the mounting axis Xa) about a vertical axis extending perpendicular to the plane of the drawing, is 5° in this practical example. A speed indicator 7 which has numbered speed marks is provided to the outside of the mounting bracket 3. At the opposite side, a shift lever 8 is attached and a cable insertion case section 3b is provided. The outer casing of the shift cable 9 from the front derailleur, rear derailleur, or other bicycle shift device (not shown) is supported by an outer casing holder 10 provided to the cable insertion case section 3b, and the inner cable 9a of the shift cable 9 is guided from the aforementioned outer casing holder 10 into the mounting bracket 3 by a plurality of guide rollers 11 located in the interior of the cable insertion case section 3b. The inner cable 9a is thereafter linked with the winder member 6 and is rotated in the take up direction or the return direction of the winder 6 by the rotating shift member 5 and the shift lever 8, so that the inner cable 9a is pulled or slackened. The shift position to which the shift device has been shifted can be readily determined from the indicator 7.

As shown in FIG. 4, in this example the winder member 4 and the rotating shift member 5 take the form of complete cylinders, are slid over the peripheral surface 4b of the aforementioned guide member 4, and are prevented from coming off on the grip 2 side by a stopper ring 12. A side guide plate 13 is inserted between the stopper ring and the right edge of the rotating shift member 5; this side guide plate 13 is provided with a 5° inclined surface, taking into consideration the fact that the axis of rotation Yb of the rotating shift member 5 is inclined at an angle of 5° with respect to the axis of the through hole 4a of the guide member 4.

Figure 3:
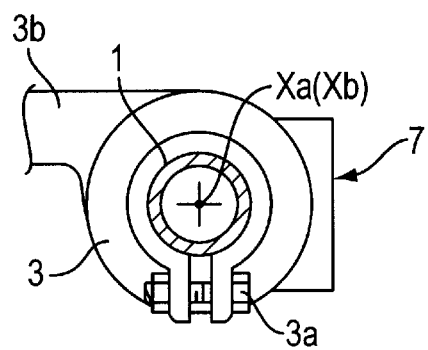
FIG. 3 is a cross-sectional view of the bicycle shift control device according to the present invention showing a particular embodiment of a mounting bracket.

As shown in FIG. 3, the shift lever 8 is rotatably mounted on the spindle 14 of the mounting bracket 3, and it is slidably biased by a return spring 16 so that it automatically returns to its home position N in contact with a lever restraining member 15 provided to the mounting bracket 3. The aforementioned spindle 14 is positioned on the front side of the handlebar 1 with respect to the direction of bicycle forward progress when the mounting bracket 3 is attached to the handlebar 1, and axis P1 is a vertical axis lying in the vertical direction of the bicycle frame. Specifically, the shift lever 8 is positioned such that its operating section 8a is located on the front side of the handlebar 1 when the mounting bracket 3 is attached to the handlebar 1 as shown in FIG. 1. Shift lever 8 comprises a sliding lever that slides around the aforementioned axis P1 and is operated by the index finger of the hand that grips the grip 2 of the handlebar 1. In contrast, the incline of the axis of rotation Yb of the rotating shift member 5 with respect to the aforementioned mounting axis Xa, i.e., the handlebar axis Xb, is set so as to diverge to a greater degree from the aforementioned mounting axis Xa closer to the central longitudinal axis of the bicycle, and is operated by the thumb of the hand that grips the grip 2 of the handlebar 1.

In this practical example, the winder member 6 is rotated in one direction by the sliding displacement of the rotating shift member 5, and the winder member 6 is rotated in the other direction by the sliding displacement of the shift lever 8. The following description refers to FIGS. 4 through 8.

A clutch 20 for transmitting the rotational force of the rotating shift member 5 to the winder member 6 comprises a pair of clutch pawls 18 and 18 that are slidably attached to the rotating shift member 5 through pawl shafts 17 and a clutch gear 19 that is attached so as to rotate in integrated fashion at one end of the winder 6 through spline engagement. The clutch pawls 18 and 18 are biased by pawl springs 21 so as to engage one of the plurality of toothed sections 19a of the clutch gear 19, and thus the clutch 20 is biased in the engaged position.

At the peripheral surface 4b of the guide 4, a fixing plate 22 is located between the winder member 6 and the rotating shift member 5 and checked by a plate mounting section to prevent it from sliding in the direction of the winder member 6. A friction plate 23 positioned between this fixing plate 22 and the rotating shift member 5, and a brake spring 24 positioned between the friction plate 23 and the fixing plate 22 together constitute a brake 25 on the rotating shift member 5. The friction plate 23 slides in the direction of the axis with respect to the guide member 4 by means of spline engagement with the guide member 4, but it does not slide in the circumferential direction. The brake spring 24 slidably biases the friction plate 23 so that it is pressed against the end of the rotating shift member 5, and by this operation the brake 25 produces a friction braking action on the rotating shift member 5.

The spring chamber formed in the winder drum section 6a of the winder member 6 is provided with a return spring 26. One end of this return spring 26 is retained by a ring flange section 4c which extends diametrically from the guide member 4, and the other end is retained by the winder member 6. Spring 26 undergoes elastic deformation as the winder member 6 rotates in the take up direction and serves to rotate the winder member in the return direction by the force of elastic recovery produced by this deformation. The guide member flange section 4c is connected to the mounting bracket 3 by a thread coupling. The return spring 26, an externally fitted release plate 27 that is capable of relative rotation and that is located between the aforementioned clutch gear 19 and the projecting drum section 6b which protrudes in the direction of the axis of the winder member, a pair of clutch disengage members 28 and 28 located between the release plate 27 and the aforementioned clutch gear 19, and an interlink rod 29 that links the aforementioned shift lever 8 and the aforementioned release plate 27 together constitute an interlink mechanism for interlinking the shift lever 8 and the winder member 6.

A ratchet gear 31 attached between the projecting drum section 4b of the winder member 6 and the aforementioned release plate 27 such that it experiences integrated rotation through spline engagement, and a position pawl 34 that is slidably attached at the rim section 4c of the guide member by a pawl spindle 32 and that is slidably biased by a pawl spring 33 so as to engage one of the tooth sections 31a of the ratchet gear 31 constitute a position mechanism 35 for holding the winder member 6 at a specified position of rotation. The aforementioned ratchet gear 31 and a return stop pawl 36 slidably attached to the aforementioned pawl spindle 32 constitute a full return stop mechanism that prevents excessive rotation when the winder member 4 rotates in the return direction.

Since the ratchet 20 is engaged through the action of the pawl spring 21 and the position pawl 34 is engaged by a tooth section 31a of the ratchet gear 31 so that the position mechanism 35 does not rotate in the winder member 4 return direction, the rotating shift member 5 can rotate only in the direction indicated by arrow F in FIG. 1. When the rotating shift member 5 is operated by sliding rotation, the clutch 20 transmits the force of rotation of the rotating shift member 5 to the winder member 6, and the winder member 6 rotates in direction C (the direction in which the inner cable 9a is taken up). At this time, the ratchet gear 31, which rotates together with the winder member 6, pushes the position pawl 34 and the return stop pawl 36 away from the toothed sections 31a as it rotates, due to the cam action produced by the shape of the tooth sections 31a. Each time that the winder member 6 rotates one rotational pitch so that the shift device is shifted by one position, the sliding bias provided by the pawl spring 33 causes the position pawl 34 to automatically engage the next tooth section 31a adjacent to the tooth section 31a that was engaged prior to shifting, so that the position mechanism 35 returns to the operative state. Thus, each time that the winder member 4 rotates one rotational pitch to a new position of rotation, the action of the position mechanism 35 serves to maintain this position of rotation.

When the winder member 6 is caused to undergo take up rotation by the rotating shift member 5, it is capable of sliding in a single operation until the position pawl 34 comes into contact with the last tooth section 31a of the ratchet gear 31. This permits shifting so that the shift device is shifted to shift positions only one position away from the shift position prior to the shifting operation while also permitting shifting so that the winder member 6 can rotate, for example, between the lowest speed location and the highest speed location in a single operation so that the shift device can be switched two or more positions from the shift position prior to the shifting operation in a single operation.

Figure 6A:
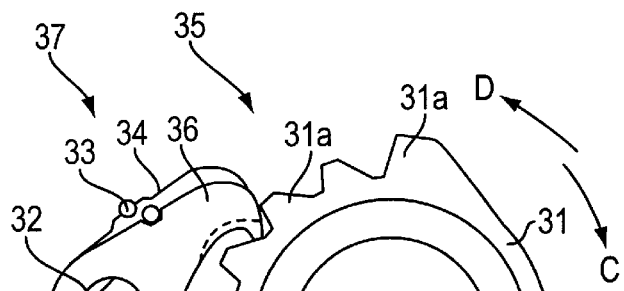
FIG. 6 is a side view illustrating a particular embodiment of a position and full return stop mechanism employed in the bicycle shift control device shown in FIG. 1.
Figure 6B:
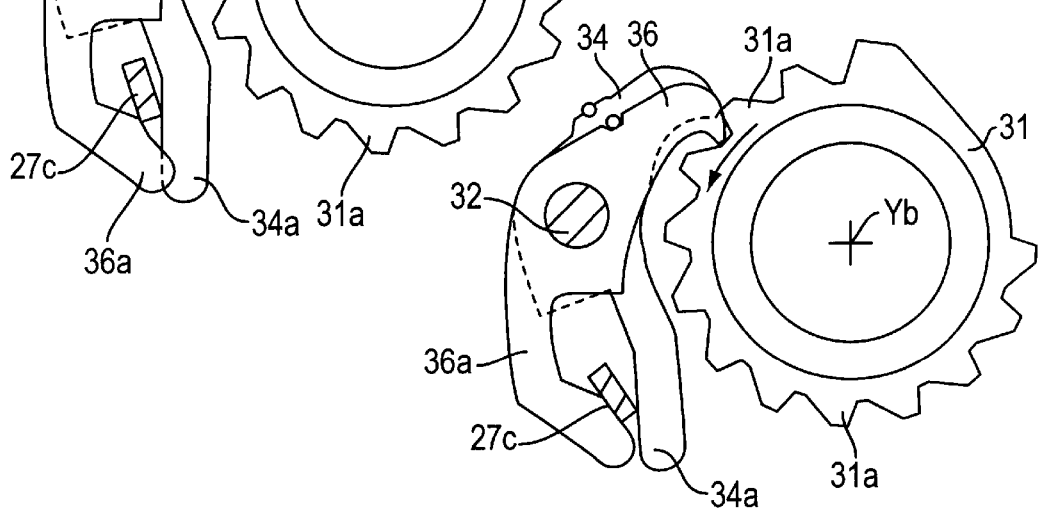
Figure 7:
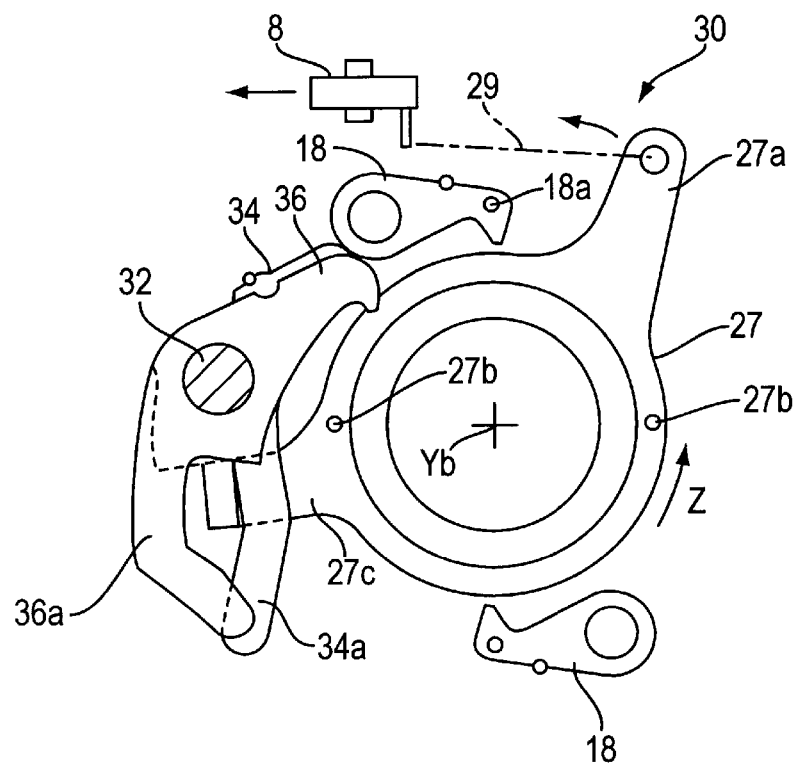
FIG. 7 is a side view illustrating a particular embodiment of a transmission mechanism employed in the bicycle shift control device shown in FIG. 1.
Figure 8:
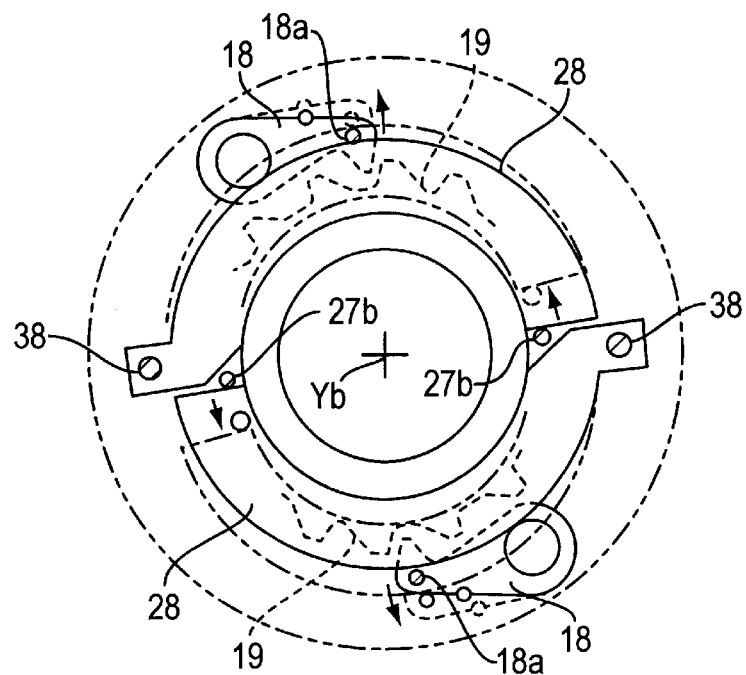
FIG. 8 is a side view illustrating a particular embodiment of a clutch mechanism employed in the bicycle shift control device shown in FIG. 1.

On the other hand, when the shift lever 8 is slid from its home position N towards the direction of the handlebar 1, the interlock rod 29 pulls the operating arm component 27a of the release plate 27 as indicated in FIG. 7 so that the release plate 27 rotates from the position depicted in FIG. 7 in direction of rotation Z, whereupon a pair of operating pins 27b and 27b provided to the release plate 27 move from the disengaged position indicated by the solid lines in FIG. 8 to the operating position indicated by the broken lines and are pressed against the free end of the clutch disengage member 28 located on one side and against the free end of the clutch disengage member 28 located on the other side, respectively. Thus, each clutch disengage member 28 pivots around a pivot pin 38, provided to the guide member 4 at a location on the side opposite the side acted upon by the aforementioned operating pin 27b, slides away from the winder member 6 from the engaged position indicated by the solid lines in FIG. 8 to the disengaged position indicated by the broken lines, and is pressed against the pin section 18a of one of the clutch pawls 18 so that the clutch pawl 18 is disengaged from the clutch gear 19. That is, the clutch 20 is disengaged. A release arm section 27c that protrudes from the release plate 27, as depicted in FIG. 7, and whose protruding end is positioned between the arm section 34a of the position pawl 34 and the arm section 36a of the return stop pawl 36, rotates in the direction of rotation Z of the release plate 27 and moves from the disengaged position depicted in FIG. 7 to the operating position depicted in FIG. 6. The release arm section 27c is pressed against the arm section 36a of the return stop pawl 36, and it slides the return stop pawl 36 so that the pawl tip is inserted between tooth sections 31a and 31a of the ratchet gear 31. In this way, the full return prevention mechanism 37 automatically assumes the operational state depicted in FIG. 6. When the winder member 6 subsequently rotates in the return direction, the rotational pitch of the winder member 6 is regulated to one rotational pitch such that the shift device shifts by only one shift position. At this time, the pawl tip of the position pawl 34 is in contact with the tooth section 31a of the ratchet gear 31 and performs a stopping action so that the winder member 6 does not rotate.

When the shift lever 8 is slid further towards the handlebar so that the release plate 27 is rotated further in the direction of rotation Z, the release arm section 27c of the release plate 27 moves to the operating position depicted in FIG. 6 and is pressed against the arm section 34a of the position pawl 34 so that the position pawl 34 is disengaged from the tooth section 31a of the ratchet gear 31. Thus, the position mechanism 35 permits the winder 6 to return by means of the operating force of the inner cable 9a and the return spring 26. As the shift lever 8 is subsequently slid back by the return spring 16 so that the release arm section 27a of the release plate 27 slides back, the position pawl 34 slides towards the ratchet gear 31 due to the action of the pawl spring 33 so that it comes into contact with the next tooth section 31a adjacent to the tooth section 31a in which it was in contact prior to the shifting operation. Thus, the position mechanism has a position retaining action with respect to the winder member 6 after it has rotated one rotational pitch.

Therefore, the shift lever 8 can only be operated to return the winder member 4. Each time that the shift lever 8 is slid from its home position N, the winder member 6, which is linked with the operation of the shift lever 8 through the interlink mechanism 30, rotates in direction of rotation D (the direction of take up of the inner cable 9a) due to the operating force of the inner cable 9a and the return spring 26. The winder member 4 is restricted to rotation by one rotational pitch due to the action of the full return stop mechanism 37, so when a position at which the shift device has been shifted by one shift position is reached, this position of rotation is maintained by the position mechanism 35.

The shift indicator 7 is mounted on the mounting bracket 3 so as to rotate around an axis that is substantially perpendicular to the handlebar axis Xb, and it comprises a rotating component 7a provided with the aforementioned speed indication marks and a stationary component 7b that takes the form of a transparent component that is positioned so as to cover the aforementioned rotating component 7a (so that the speed indication marks are visible) and is fixed to the mounting bracket 3. The aforementioned rotating component 7a is linked by engagement with a gear section 6c formed on one end of the winder member 6, as shown in FIG. 3, and rotates in tandem with the winder member 6. When the winder member 6 reaches a specified position of rotation, the mark from among the plurality of aforementioned speed indication marks that indicates the shift position of the shift device halts in alignment with an indicator mark 7c provided to the stationary component 7b and depicted in FIG. 2A. By noting which speed indication mark is the speed indication mark that is aligned with the indicator mark 7c, it is possible to determine the speed to which the shift device has been shifted.

Figure 9:
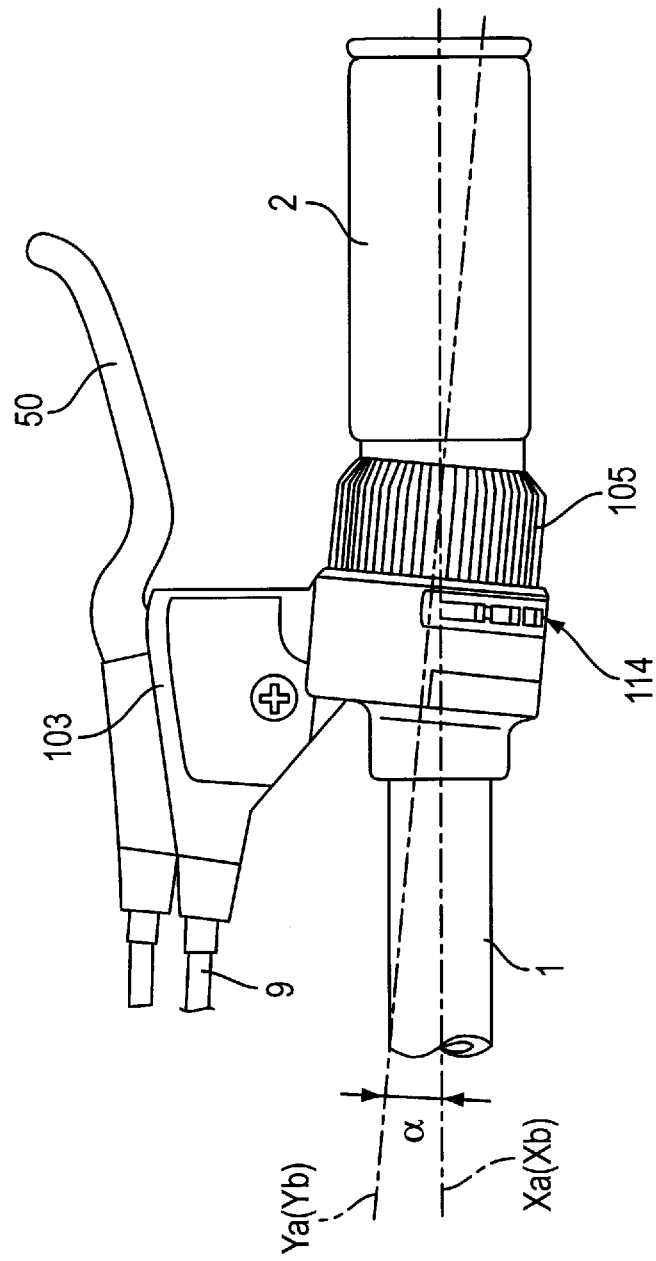
FIG. 9 is a plan view illustrating another embodiment of a bicycle shift control device according to the present invention.

FIG. 9 is a plan view illustrating another embodiment of a bicycle shift control device according to the present invention. In this embodiment, operation of the shift cable 9 is conducted solely by a rotating shift member 105, and no shift lever 8 is provided.

Figure 10:
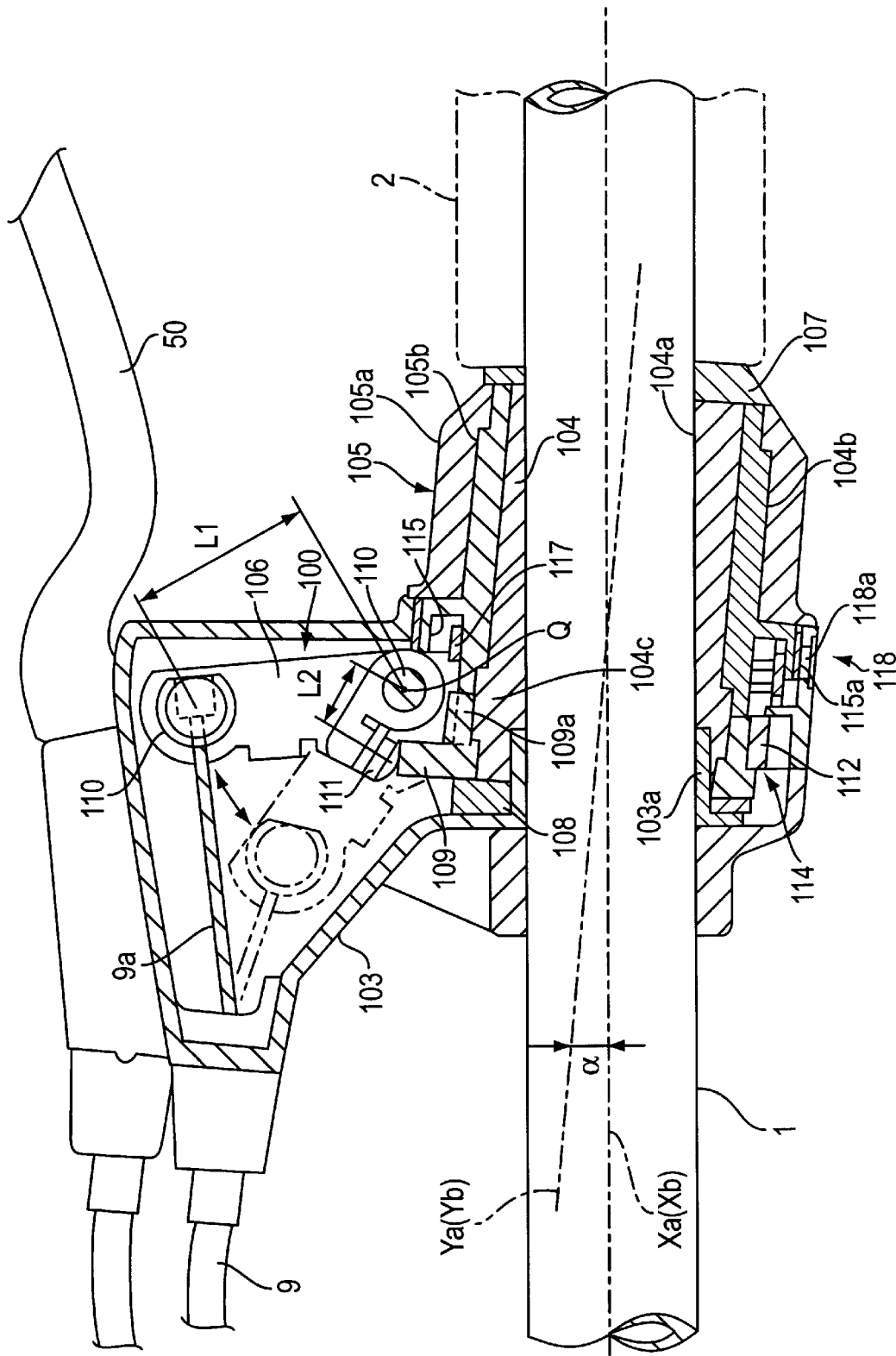
FIG. 10 is a cross-sectional view of the bicycle shift control device shown in FIG. 9.

As depicted in FIG. 10, the rotating shift member 105 comprises an outer sleeve 105a on whose peripheral surface serrations have been formed to prevent slip and an inside sleeve 105b that fits inside the outer sleeve 105a and that is constituted by pressure bonding, by adhesion, or by linkage so as to undergo integrated rotation with the outer sleeve 105a. If desired, the outer sleeve 105a may be fabricated from an elastic material such as rubber that is comfortable to the finger and has non-slip properties, and the inside sleeve 105b may be fabricated from metal which can be machined with high accuracy. The rotating shift member (105) fits slidably over the exterior of the peripheral surface 104b of the guide member 104 which is fixed to the handlebar 1. The rotating shift member 105 is prevented from coming off the guide member 104 by a stopper section 104c formed at one end of the guide member 104 and a first side guide plate 107 located at the other end. The guide member 104 is provided with a through hole 104a, and the guide member 104 is slid onto the handlebar 1 using this through hole 104a so that the positional relationship of the guide member 104, and therefore the rotating shift member 105, with respect to the handlebar is determined. That is, the axis of rotation Yb of the rotating shift member 105 is inclined at an angle $\alpha$ (5° in this case) with respect to the handlebar axis Xb.

Figure 11:
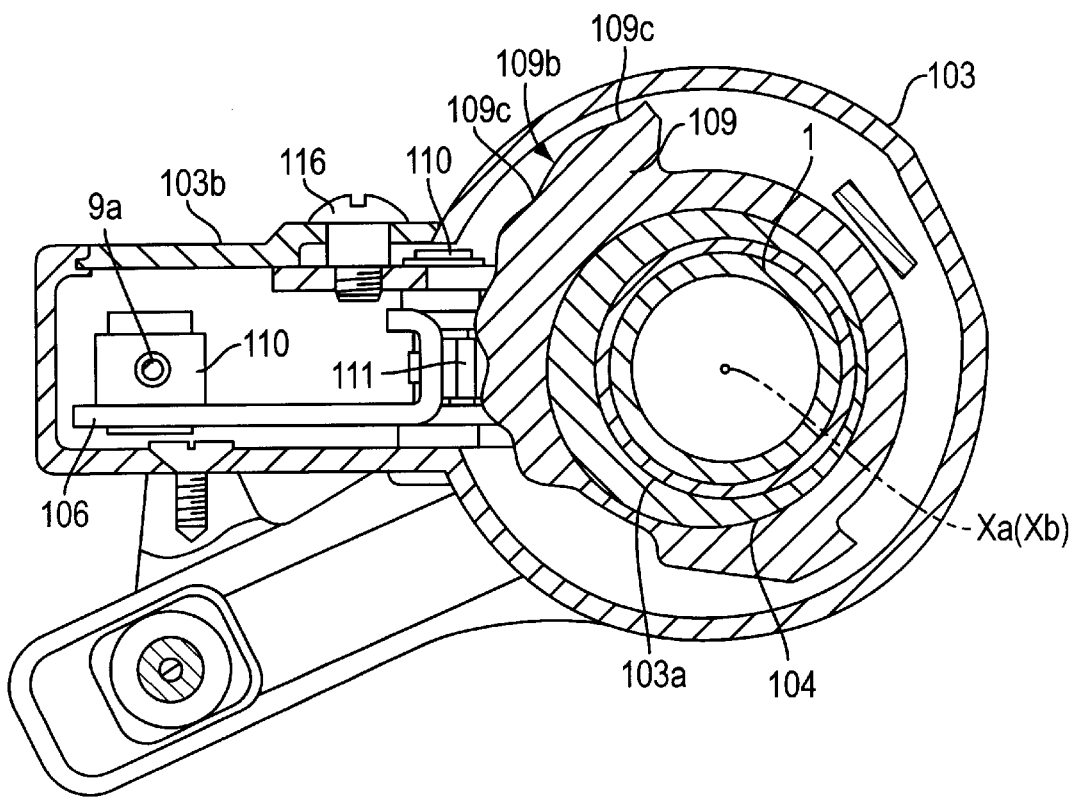
FIG. 11 is a side view illustrating a particular embodiment of a shift operating cam mechanism employed in the bicycle shift control device shown in FIG. 10.

In order to achieve the desired angle of inclination, the axis Ya of the peripheral surface 104b of the guide member 104 that forms the displacement guide path for the rotating shift member is inclined by angle $\alpha$ with respect to the axis Ya of the through hole 104a. The aforementioned guide member 104 is formed so as to slip over the handlebar 4, and in order to fix the guide member 104 to the handlebar 1, the mounting bracket 103 is provided with a mounting cylinder 103a that slips over the handlebar 1. The edge of this mounting cylinder 103a and the edge of the guide member 104 mesh. As depicted in FIG. 11, the mounting bracket 103 forms, by means of a thread coupling, an integrated unit with a lever bracket section for attaching a brake lever 50 to the handlebar 1.

As shown in FIG. 10, the shift control device 100 comprises a shift cam section 109, consisting of a rotary cam member rotatably attached at the peripheral surface 104b of the guide member 104, and a slide lever 106 attached to the mounting bracket 103 through a spindle 110 so that it slides around axis Q. Engagement of a spline formed in the boss section 109a of the shift cam section 109 and a spline formed on one end of the inside sleeve 105b of the aforementioned rotating shift member 105 serves to link the shift cam section 109 and the rotating shift member 105 so that they rotate in integrated fashion. Movement in the axial direction is regulated at the other end of the shift cam section 109 by a second guide plate 109. Thus, when the rotating shift member 105 is operated by sliding rotation, the shift cam section 109 rotates around the axis of rotation Yb. A rotary cable coupling section 110 is formed at one end of the slide lever 106 by providing a freely rotating rotary cable coupling, and the inner cable 9a of the aforementioned shift cable 9 is coupled to this cable coupling section 110. A cam follower 111 is provided between the aforementioned cable coupling section 110 of the sliding lever 106 and the aforementioned axis of rotation Q, and the slide lever 106 is slidably biased, via the aforementioned inner cable 9a, by the self-recovering force of the shift device so that the aforementioned cam follower is normally in contact with the cam surface 109b of the shift cam section 109. The aforementioned cam surface 109b has the shape depicted in FIG. 11 when viewed along the aforementioned axis of rotation Xb. As the shift cam section 109 rotates, the slide lever 106 slides around the aforementioned axis of rotation Q so that the aforementioned inner cable is pulled in opposition to the self-recovering force of the shift device or is slackened so that the shift device is switched by self-recovering force.

The aforementioned shift cam surface 109b is provided with indented sections 109c corresponding in number to the number of speeds of the shift device, and the sliding lever 106 performs a slackening or pulling operation of specified stroke distance on the inner cable 9 so that the shift device is switched to the specified shift position, whereupon the aforementioned cam follower 111 enters the aforementioned indented section 109c which corresponds to this shift position. The engagement of the shift cam section 109 and the slide lever 106 produced by this entry positions the shift cam section 109 at the specified operating position to which it has been rotated, maintaining the shift position to which the shift device has been switched. Thus, when the rotating shift member 105 is operated by sliding rotation, the shift control device 100 pulls or slackens the inner cable of the shift cable 9 by this operating physical force so that the shift device is switched to the specified speed level.

The distance L1 from the axis of rotation Q of the aforementioned shift lever 106 to the center of the wiring coupling of the cable coupling section 110 is greater than the distance L2 from the axis of rotation Q to the cam section contact point of the cam follower 111. Thus, the stroke distance over which the inner cable 9a moves in the tensing direction or the slackening direction produced by the slide of the slide lever 106 is long in proportion to the angle of the slide operation of slide lever 106 by the shift cam section 109. That is, despite the small size of the shift cam section 109 and the compactness of the shift control device 100, it is still possible for the inner cable 9a to move over the stroke distance required for shifting.

Figure 12:
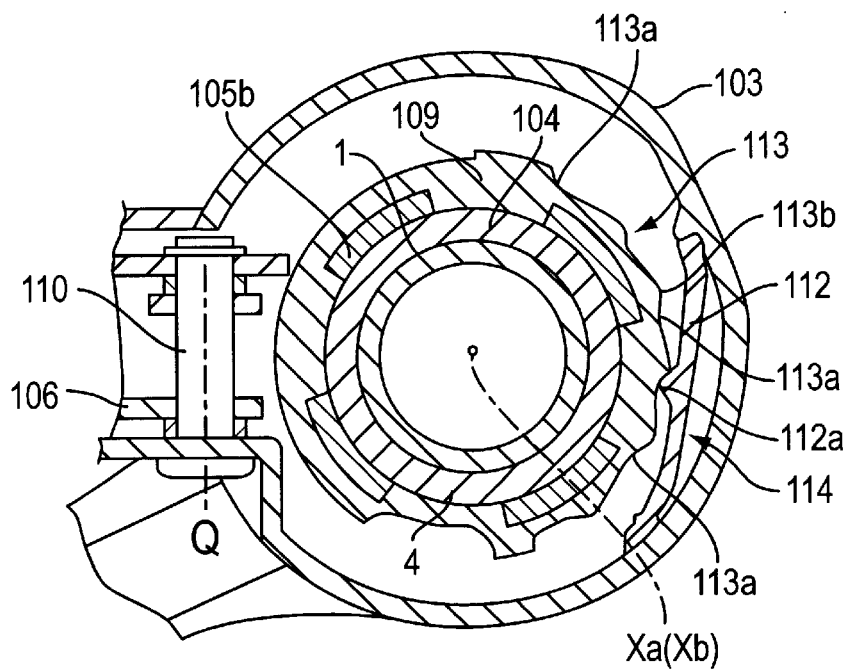
FIG. 12 is a side view illustrating a particular embodiment of an indexing mechanism employed in the bicycle shift control device shown in FIG. 10.

As depicted in FIG. 12, a striking member 112 consisting of an elastic body affixed within the aforementioned mounting bracket 103 and a struck section 113 formed on the rotary cam member that constitutes the aforementioned shift cam section 109 together comprise a noise-making mechanism 114 for indicating shifting. Specifically, the struck section 113 is provided with depressions 113a corresponding in number to the number of speeds of the shift device and is designed so that when the shift cam section 109 is in a given operating position, the striking action protruding section 112a of the striking member 112 is aligned with the aforementioned depression 113a that corresponds to this operating position. When a shift operation is performed and the shift cam section 109 rotates, the struck section 113 rotates as well, and in association with this action, the striking action protruding section 112a of the striking member 112 rides up on the protruding sections 113b of the struck member 113 so that the striking member 112 experiences elastic deformation. As the shift cam section 109 continues to rotate to a specified operating position, the striking action protruding section 112a slides over a protruding section 113b of the struck member 113 and falls into an adjacent depression 113a, and the elastic recovery force of the striking member 112 produced by elastic deformation up to this point causes the striking action protruding section 112a to come into contact with the depression 113a in striking fashion. Thus, when a shift operation is performed and the shift position of the shift device is shifted, the noise-making mechanism 114 emits a noise produced by contact of the striking member 112 and the depression 113 indicating the shifting of the shift device.

Figure 13:
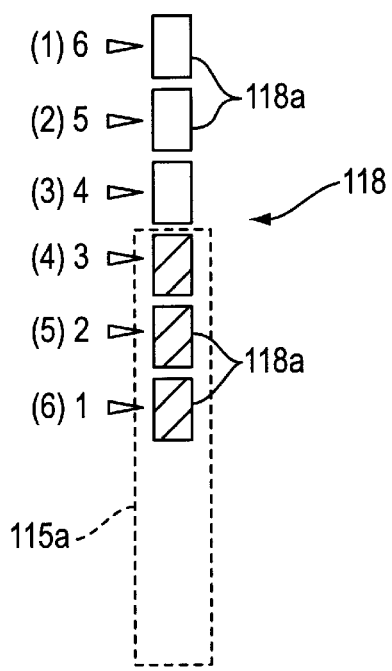
FIG. 13 is a view illustrating a particular embodiment of a speed indicating mechanism employed in the bicycle shift control device shown in FIG. 10.

As shown in FIGS. 9 and 10, the aforementioned mounting bracket 103 is provided with a speed indicator section in which indicator windows 118a, provided in a number corresponding to the number of speeds of the shift device, are lined up in the direction of rotation of a rotating grip, and a speed indicator drum 115 is formed at one end of the inner sleeve 105 of the aforementioned rotating shift member 105, constituting a speed indicator mechanism. Specifically, when a shifting operation is performed and the rotating shift member 105 is slid, the accompanying rotation of the speed indicator drum 115 transports a color band member 115a, formed by applying a sticker to the speed indicator drum 115, along the inside of the row of indicator windows. When the device is shifted to a given shift position, as in the case when the shift device has been shifted to the third speed depicted in FIG. 13, the interiors of a number of indicator windows 118 corresponding to the ranking of the shift position to which the shift device has been shifted change from the color of the section of the speed indicator drum 115 other than the color band member 115a to the color of the color band member 115a. Specifically, as the shift device is upshifted from the lowest speed, the window interiors sequentially change color to the color of the color band member 115a, beginning with the indicator window 118 located at the end of the indicator window row and corresponding to the lowest speed. Thus, the number of colored indicator windows, counted from the low speed end of the indicator window row, indicates the current shift position of the shift device.

The mounting screw 116 depicted in FIG. 11 serves to fasten the lid member section 103b that covers the aperture provided in the aforementioned mounting bracket 103 for coupling the slide lever 106 and the inner cable 9a to the main body of the mounting bracket 103. One end of a coil spring 117, depicted in FIG. 10, is retained by the mounting bracket 103 while the other end is retained by the inner sleeve 105b of the rotating shift member 105. When the rotating shift member 105 is slid so as to pull the inner cable 9a, it biases the rotating shift member 105, becoming partially transformed into operating physical force, thus facilitating manual operation.

Figure 14:
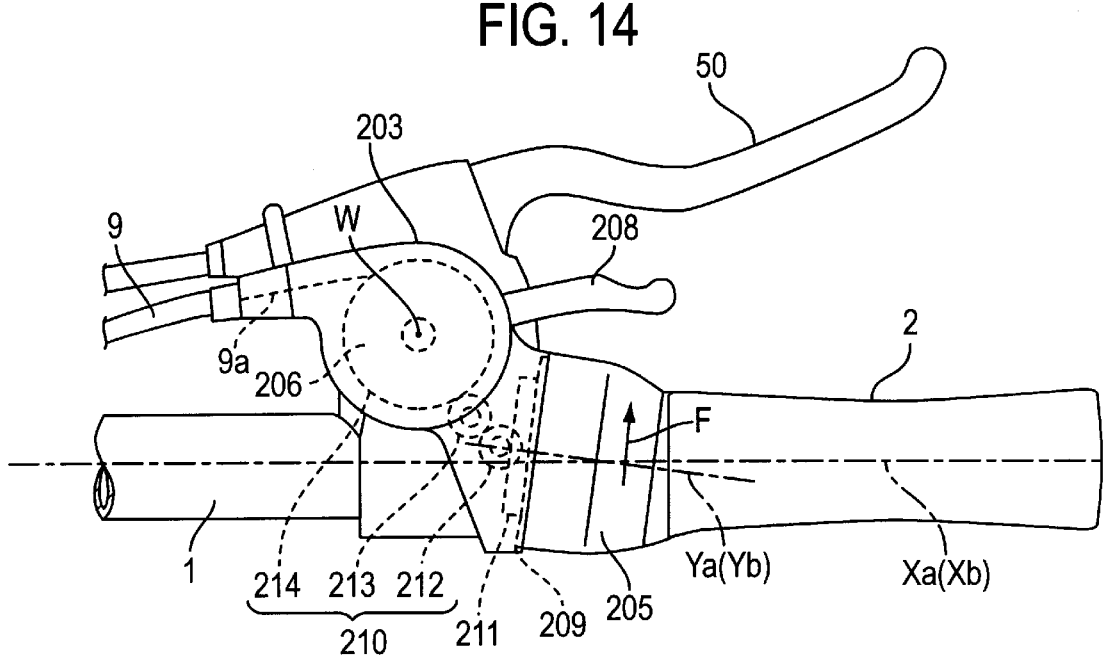
FIG. 14 is a plane view illustrating another embodiment of a bicycle shift control device according to the present invention.

FIG. 14 is a plan view illustrating another embodiment of a bicycle shift control device according to the present invention. This embodiment is similar to the embodiment shown in FIG. 1, but in this case the axis of rotation Yb of the rotating shift member 105 and the axis of rotation W of the winder member 206 are different. Specifically, the axis of rotation W of the winder member 206 is positioned substantially perpendicular to the handlebar axis. This structure requires deflected force transmission means 210, located between the clutch gear 211 which receives the sliding displacement of the rotating shift member 105 via the clutch pawl and the winder member 206, for transmitting the rotational force of the rotating shift member 105 to the winder member 206, which is not positioned concentrically. This deflected force transmission means 210 comprises a first bevel gear 211 located at the edge of the clutch gear 211, a first intermediate gear 212 provided with a bevel gear section that meshes with the first bevel gear 211 and a flat gear section, a second intermediate gear 213 that meshes with the flat gear section of the first intermediate gear 212, and a gear section 214 that meshes with the aforementioned second intermediate gear 212 and that is formed on the peripheral surface of the aforementioned winder member.

The structure of the clutch pawl and the clutch gear 211, the full return stop mechanism and the position mechanism provided to the periphery of the winder member 206, and the structure of the shift lever 208 are the same as in the first embodiment, so a repetition of the previous description is omitted here.

Figure 15:
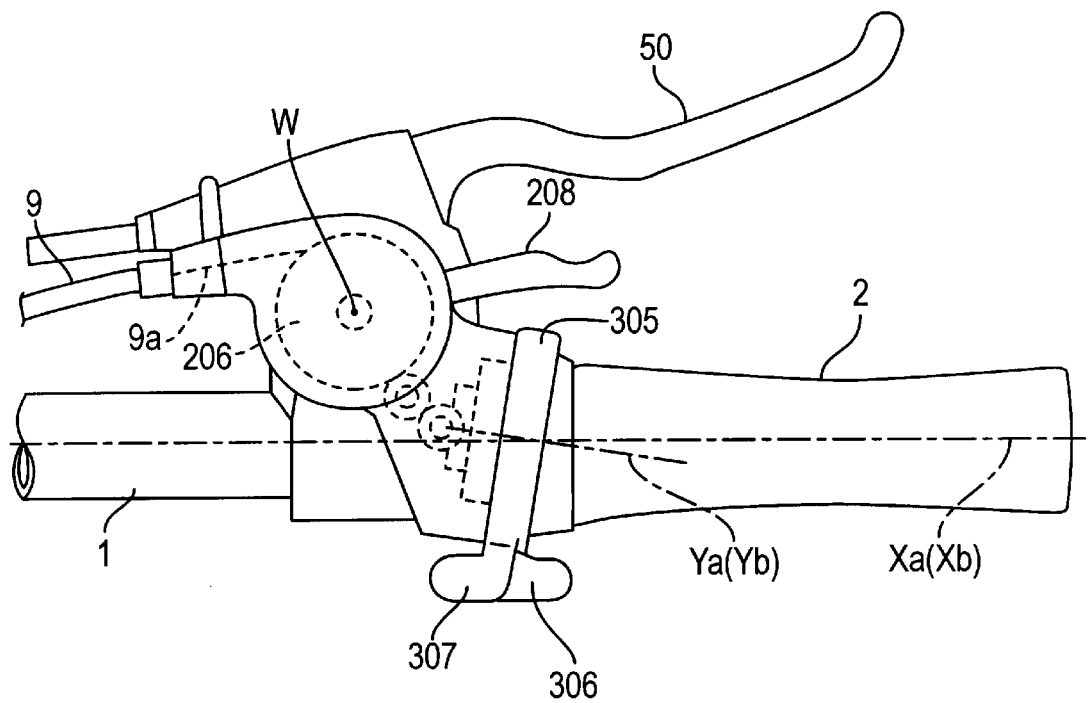
FIG. 15 is a plane view illustrating another embodiment of a bicycle shift control device according to the present invention.

FIG. 15 is a plan view illustrating another embodiment of a bicycle shift control device according to the present invention. In this embodiment, which is similar to the embodiment shown in FIG. 9, the width of the rotating shift member 305 is smaller, and the peripheral surface of the rotating shift member 305 is provided with a first finger-operated member 306 and a second finger-operated member 307 as a substitute.

Figure 16:
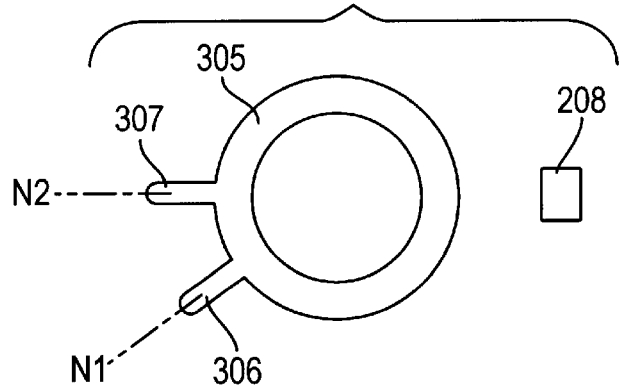
FIG. 16 is a side view of a particular embodiment of a rotatable shift member used in the bicycle shift control device shown in FIG. 15.

The rotating shift member 305 is constituted so as to rotate back to the home position due to a return spring. When the first rotating shift member 305 is positioned at the home position, the first finger-operated member 306 and the second finger-operated member 307 are positioned at home positions N1 and N2, depicted in FIG. 16. Specifically, the home position N2 of the second finger-operated member 307 is located at a higher level than is the home position N1 of the first finger-operated member 306. Thus, the use of the first finger-operated member 306 is relatively easier when shifting by one speed only, as less lifting of the finger is required than when the second finger-operated member 307 is used. The use of the second finger-operated member 307 is relatively easier when shifting over a predetermined plurality of speeds (two or more speeds) in a single shifting operation, as a rotation operation entailing a relatively large angle of rotation of the first rotating shift member 5 is easier than with the first finger-operated member 306. Thus, accurate operation, despite the necessity to rotate the winder member 206 over a plurality of rotation pitches, is possible.

Figure 17:
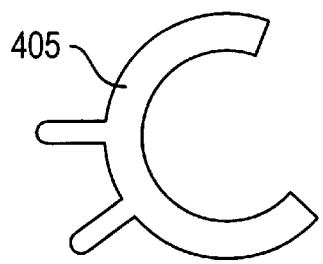
FIG. 17 is a side view of an alternative embodiment of a rotatable shift member used in the bicycle shift control device shown in FIG. 16.

The rotating shift member need not be a complete ring member. Instead, the rotating shift member 405 can comprise a partial ring member in which a section has been cut out, as depicted in FIG. 17.

While the above is a description of various embodiments of the present invention, it is clear that many modifications may be employed and still be within the spirit and scope of the present invention. For example, the specific structures described in the various embodiments can be used in any combination, and these combinations are also included within the scope of the present invention. While an angle of inclination of 5° was given as an example, an angle of between approximately 5° and 40° may be desirable, depending upon the application. Thus, the scope of the invention should not be limited by the specific structures disclosed. Instead, the scope of the present invention should be determined by the following claims. Of course, although labelling symbols are used in the claims in order to facilitate reference to the figures, the present invention is not intended to be limited to the constructions in the appended figures by such labelling.

What is claimed is:

1. A bicycle shift control device comprising:
   a guide member (4,104) for mounting coaxially with a longitudinal axis (Xb) of a handlebar of a bicycle; and
   a rotatable shift member (5,105,205,305,405) guided by the guide member (4,104) for rotation around the axis (Xb) of the handlebar and coaxially with a rotational axis (Yb);
   wherein the rotational axis (Yb) of the shift member (5,105,205,305,405) is inclined relative to the axis (Xb) of the handlebar.

2. The device according to claim 1 wherein the rotatable shift member (5,105,205,305,405) comprises a ring member (5,105,205,305) that surrounds both the axis (Xb) of the handlebar and the rotational axis (Yb).

3. The device according to claim 2 wherein the ring member (5,105,205,305) moves over a path (4b,104b) formed by the guide member (4,104).

4. The device according to claim 1 wherein the rotatable shift member (5,105,205,305,405) comprises a partial ring member (405) that curves around both the axis (Xb) of the handlebar and the rotational axis (Yb).

5. The device according to claim 4 wherein the ring member (405) moves over a path (4b,104b) formed by the guide member (4,104).

6. The device according to claim 1 wherein the rotatable shift member (305,405) comprises at least one finger-operated member (306,307) which extends outwardly from the rotatable shift member (305,405).

7. The device according to claim 1 wherein the rotatable shift member (305,405) comprises a first finger-operated member (306) and a second finger-operated member (307), each of which extends outwardly from the rotatable shift member (305,405) at a prescribed spacing from each other.

8. The device according to claim 1 further comprising:
   a cable shift member (106) for coupling to a shift cable; and
   a transmission mechanism (109,111) that transmits displacement of the rotatable shift member to the cable shift member (106).

9. The device according to claim 8 wherein the cable shift member comprises a slide lever (106) pivotally coupled to the shifting device at one end and to the shift cable at another end, and wherein the transmission mechanism comprises:
   a cam (109) coupled for rotation in response to rotation of the rotatable shift member (105); and
   a cam follower (111) coupled to the slide lever (106).

10. The device according to claim 1 further comprising a winding member (6) for attachment to a shift cable, the winding member (6) being coupled for coaxial rotation about the rotational axis (Yb) of the shift member (5,105, 205,305,405) in response to rotation of the rotatable shift member (105).

11. The device according to claim 10 further comprising a one-way clutch (20) coupling the rotatable shift member (5) to the winding member (6).

12. The device according to claim 1 further comprising:
    a winding member (206) for attachment to a shift cable, the winding member being coupled for rotation about an axis (W) that is oriented differently from the rotational axis (Yb) of the shift member (5,105,205,305, 405); and
    transmission means (210) for transmitting rotational force from the rotatable member (205) to the winding member (206).

13. The device according to claim 12 wherein the transmission means comprises a gear transmission mechanism (211,212,213,214).

14. The device according to claim 1 further comprising:
    a shift lever (8);
    a winding member (6) for attachment to a shift cable;
    a clutch (20) for coupling rotation of the rotatable shift member (5) to the winding member (6) in a first rotational direction; and
    an interlink mechanism (30) coupled to the shift lever (8) and to the winding member (6) for causing the winding member (6) to move in a second rotational direction in response to movement of the shift lever (8).

15. The device according to claim 14 wherein a direction of displacement of the rotatable shift member (5) is different from a direction of displacement of the shift lever (8).

16. The device according to claim 1 wherein the rotational axis (Yb) of the shift member (5,105,205,305,405) is inclined about a vertical axis.

17. The device according to claim 16 wherein an angle of inclination ($\alpha$) between the axis (Xb) of the handlebar and the rotational axis (Yb) of the shift member (5,105,205,305, 405) is from approximately 5° to approximately 40°.

18. A bicycle shift control device comprising:
    a rotatable shift member (5,105,205,305,405);
    a guide member (4,104) including a mounting hole for mounting the guide member (4,104) around the perimeter of a handlebar coaxially with a longitudinal axis (Xb) of the handlebar and a guide surface (4b, 104b) for determining a displacement path of the rotatable shift member (5,105,205,305,405) around the axis (Xb) of the handlebar and coaxially with a rotational axis (Yb); and
    wherein the rotational axis (Yb) of the rotatable shift member (5,105,205,305,405) is inclined relative to the axis (Xb) of the handlebar.

19. A bicycle shift control device comprising:
    a guide member (4,104) for mounting to a handlebar of the bicycle, the guide member (4,104) having an inner peripheral surface (4a, 104a) oriented substantially coaxially with a longitudinal axis (Xb) of the handlebar and an outer peripheral surface (4b, 104b) coaxial with a rotational axis (Yb), wherein the rotational axis (Yb) is inclined relative to the axis (Xb) of the handlebar; and
    a rotatable member (5,105,205,305,405) guided by the outer peripheral surface (4b,104b) of the guide member (4,104) for rotation around the axis (Xb) of the handlebar and coaxially with the rotational axis (Yb).

20. The device according to claim 19 wherein the rotatable member (5,105,205,305,405) includes an inner peripheral surface (5b,105b) which opposes the outer peripheral surface (4b,104b) of the guide member (4,104).

21. The device according to claim 20 wherein the inner peripheral surface (5b,105b) of the rotatable member (5,105, 205,305,405) is in sliding contact with the outer peripheral surface (4b,104b) of the guide member (4,104).

* * * * *